US010018832B2

United States Patent
Ishikawa et al.

(10) Patent No.: US 10,018,832 B2
(45) Date of Patent: Jul. 10, 2018

(54) MEMS OPTICAL SCANNER

(71) Applicant: JVC KENWOOD Corporation, Yokohama-shi (JP)

(72) Inventors: Jun Ishikawa, Yokohama (JP); Katsunori Ohshima, Yokohama (JP); Wataru Fujisawa, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 382 days.

(21) Appl. No.: 14/705,257

(22) Filed: May 6, 2015

(65) Prior Publication Data

US 2015/0234177 A1   Aug. 20, 2015

Related U.S. Application Data

(63) Continuation of application No. PCT/JP2013/083773, filed on Dec. 17, 2013.

(30) Foreign Application Priority Data

Dec. 28, 2012   (JP) .................................. 2012-287410

(51) Int. Cl.
  *G02B 26/08* (2006.01)
  *G02B 26/10* (2006.01)
(52) U.S. Cl.
  CPC ..... *G02B 26/0858* (2013.01); *G02B 26/0833* (2013.01); *G02B 26/101* (2013.01)
(58) Field of Classification Search
  None
  See application file for complete search history.

(56) References Cited

U.S. PATENT DOCUMENTS 6,618,186 B2    9/2003   Kaeriyama
7,990,595 B1 *  8/2011   Chou ................... G02B 26/085
                                          359/198.1

FOREIGN PATENT DOCUMENTS

JP   2002-189178 A   7/2002
JP   2004-198648 A   7/2004
(Continued)

OTHER PUBLICATIONS

International Search Report in PCT International Application No. PCT/JP2013/083773, dated Jan. 21, 2014.
(Continued)

*Primary Examiner* — Darryl J Collins
*Assistant Examiner* — Journey Sumlar
(74) *Attorney, Agent, or Firm* — Venable LLP; Michael A. Sartori; Laura G. Remus (57) ABSTRACT

Provided is a MEMS optical scanner that stably performs a scan with light by rotary moving a mirror centering on a V-axis in coincidence with a resonant frequency that enables ramp wave driving while securing shock resistance. The MEMS optical scanner includes a first substrate, a driving portion that drives the mirror by a piezoelectric film in a first axial direction where the piezoelectric film is installed on the first substrate, a frame that supports a driving portion, a second substrate, a support portion that supports the first substrate, a frame portion spaced from and surrounding the support portion, and an axis portion that supports the support portion and the frame portion along a second axial direction. It also includes a rigidity giving portion fixed to the second substrate at both ends thereof along the second axial direction and that drives the support portion in the second axial direction.

6 Claims, 5 Drawing Sheets

(56) References Cited

FOREIGN PATENT DOCUMENTS

| JP | 2009-213296 A | 9/2009 |
|---|---|---|
| JP | 2011-043554 A | 3/2011 |
| JP | 2012-093431 A | 5/2012 |
| JP | 2012-163828 A | 8/2012 |
| JP | 2012-252265 A | 12/2012 |
| WO | WO-2009/119568 A1 | 10/2009 |

OTHER PUBLICATIONS

Office Action in Japanese Patent Application No. 2014-554342, dated Jan. 26, 2016.

* cited by examiner

MEMS OPTICAL SCANNER

CROSS-REFERENCE TO RELATED APPLICATION(S)

This application is a continuation of PCT international application Ser. No. PCT/JP2013/083773 filed on Dec. 17, 2013 which designates the United States, incorporated herein by reference, and which claims the benefit of priority from Japanese Patent Application No. 2012-287410, filed on Dec. 28, 2012, the entire contents of which are incorporated herein by reference.

BACKGROUND OF THE INVENTION

1. Field of the Invention

The present invention relates to a micro electro-mechanical system (MEMS) optical scanner.

2. Description of the Related Art

The MEMS optical scanner has been used in an image display apparatus that displays a picture by performing a scan with light. The MEMS optical scanner is capable of displaying an image by performing the scan with the light by allowing a mirror to reflect the light while rotary driving the mirror centering on each of two axial directions.

For example, in Japanese Laid-open Patent Publication No. 2012-163828, a MEMS optical scanner is disclosed in which a mirror is supported by two main arms at each of both ends thereof, or by four main arms in total. Each of the main arms is coupled to one end of a sub-arm, in which a piezoelectric film is installed, and furthermore, the other end of each of the sub-arms is fixed to a frame. The mirror, the main arms, and the sub-arms are obtained in an integrated state by processing an integral silicon substrate. In this MEMS optical scanner, the mirror is driven through the sub-arms and the main arms by expanding and contracting the piezoelectric film and by applying a drive signal to the piezoelectric film. According to this configuration, it is possible to rotate the mirror centering on each of an H-axis, or an axis along a horizontal direction, and a V-axis, or an axis along a vertical direction.

In this MEMS optical scanner, rotary driving centering on the H-axis of the mirror is often performed at a relatively high scanning speed. From a viewpoint of efficiency, this rotary driving is performed in a resonance mode by giving an external force to the mirror such that it coincides with a resonant frequency of the silicon substrate, which is a material of the mirror. On the other hand, compared to the rotary driving centering on the H-axis of the mirror, rotary driving centering on the V-axis of the mirror is often performed at a low scanning speed. This rotary driving is performed in a non-resonance mode by stopping coincidence with the resonant frequency of the silicon substrate and by giving the external force to the mirror such that predetermined linearity and efficiency are secured. In this rotary driving, ramp wave driving having a relatively large part contributing to image display becomes possible, whereby the efficiency is relatively good.

The MEMS optical scanner disclosed in Japanese Laid-open Patent Publication No. 2012-163828, however, is poor in shock resistance and is sometimes damaged when a rotary movement centering on the V-axis is performed, whereby it is not capable of stably performing a scan with the light. In addition, stray light is caused, whereby it is not capable of performing the image display with a high image quality.

On the other hand, there is a MEMS optical scanner in which a silicon substrate is fixed on a flexible printed circuit board and a mirror is rotated centering on a V-axis by rotating the flexible printed circuit board centering on the V-axis. The flexible printed circuit board to be rotary moved has a very low resonant frequency and has shock resistance better than that of the silicon substrate. Therefore, in this MEMS optical scanner, compared to the MEMS optical scanner disclosed in Japanese Laid-open Patent Publication No. 2012-163828, although the shock resistance is secured, it is necessary to perform rotary driving centering on the V-axis of the mirror by coinciding with the low resonant frequency of the flexible printed circuit board. In addition, this rotary driving is sign wave driving. Compared to the ramp wave driving, the sign wave driving has a large part difficult to contribute to the image display, whereby it is not efficient.

SUMMARY OF THE INVENTION

It is an object of the present invention to at least partially solve the problems in the conventional technology.

There is provided a MEMS optical scanner that includes a first substrate constituted of a silicon substrate; a mirror formed in the first substrate; a driving portion configured to drive the mirror by a piezoelectric film in a first axial direction, the piezoelectric film being installed on the first substrate; a frame formed in the first substrate and configured to support the driving portion; a second substrate constituted of a flexible printed circuit board; a support portion formed in the second substrate and configured to support the first substrate; a frame portion formed in the second substrate and spaced from and surrounding the support portion; and an axis portion formed in the second substrate and configured to support the support portion and the frame portion along a second axial direction, and the MEMS optical scanner further comprises a rigidity giving portion fixed to the second substrate at both ends thereof along the second axial direction so as to support the frame portion and the support portion as well as having a Young's modulus that increases rigidity and a resonant frequency of the second substrate, and the rigidity giving portion drives the support portion in the second axial direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiment

Figure 1:
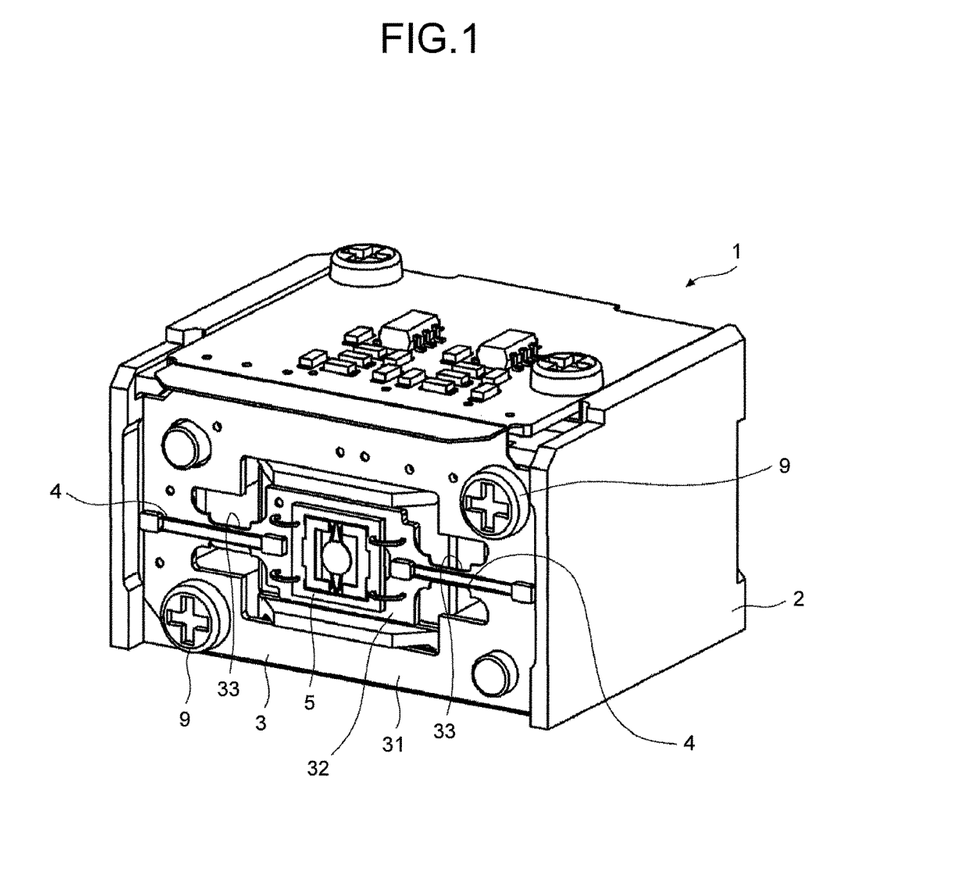
FIG. 1 is an overall perspective view illustrating a MEMS optical scanner.

Hereinafter, an embodiment of the present invention is described with reference to FIGS. 1 to 4. FIG. 1 is an overall perspective view illustrating a MEMS optical scanner. FIG.

Figure 3A:
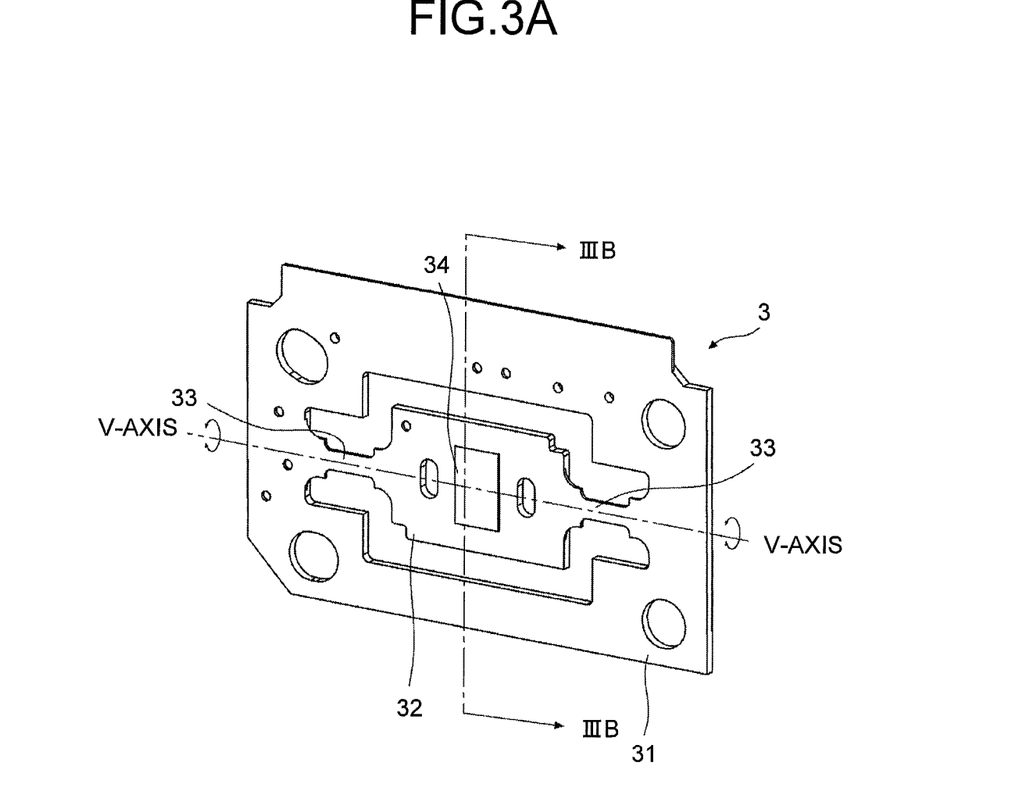
FIG. 3A is a perspective view illustrating a substrate.
Figure 3B:
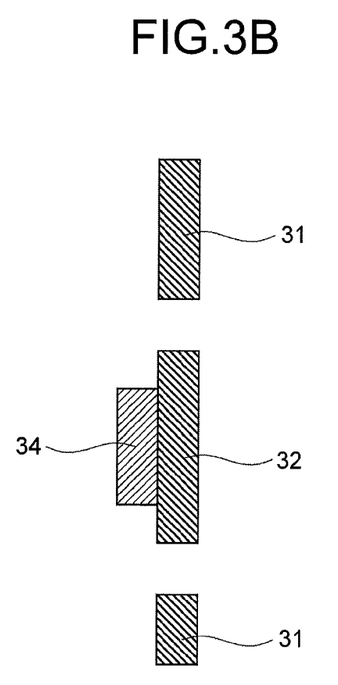
FIG. 3B is a sectional view illustrating the substrate.
Figure 4:
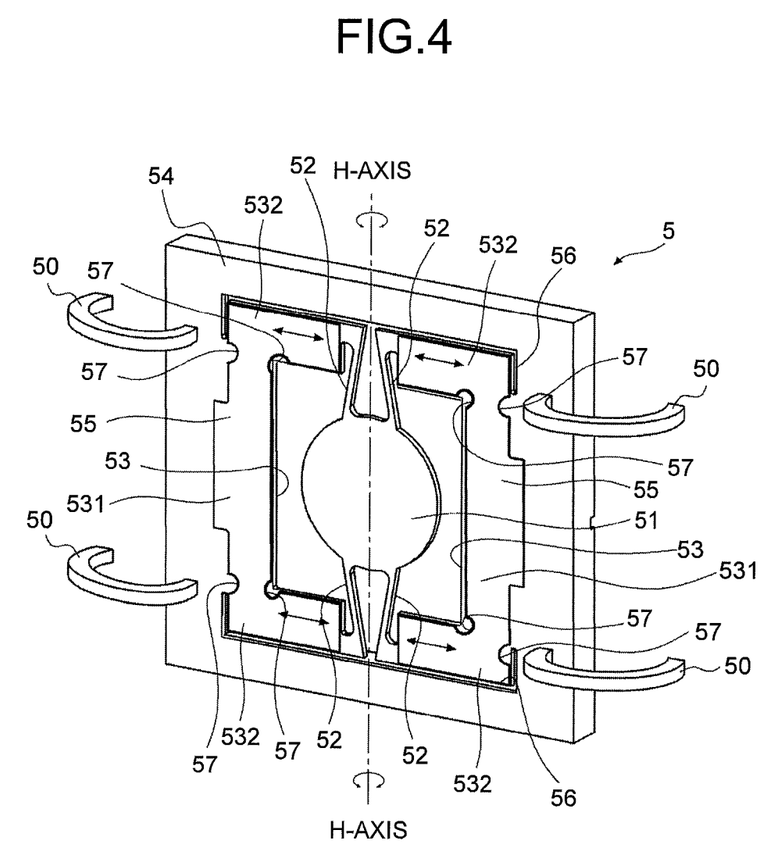
FIG. 4 is a perspective view illustrating an optical scanner element.

2 is an exploded perspective view illustrating the MEMS optical scanner. FIG. 3A is a perspective view illustrating a substrate. FIG. 3B is a sectional view illustrating the substrate. FIG. 4 is a perspective view illustrating an optical scanner element.

As illustrated in FIG. 1, a MEMS optical scanner 1 includes a housing 2, a substrate 3, a wire 4, and an optical scanner element 5. The MEMS optical scanner 1 is used for displaying an image by performing a scan with light in each of two axial directions.

Figure 2:
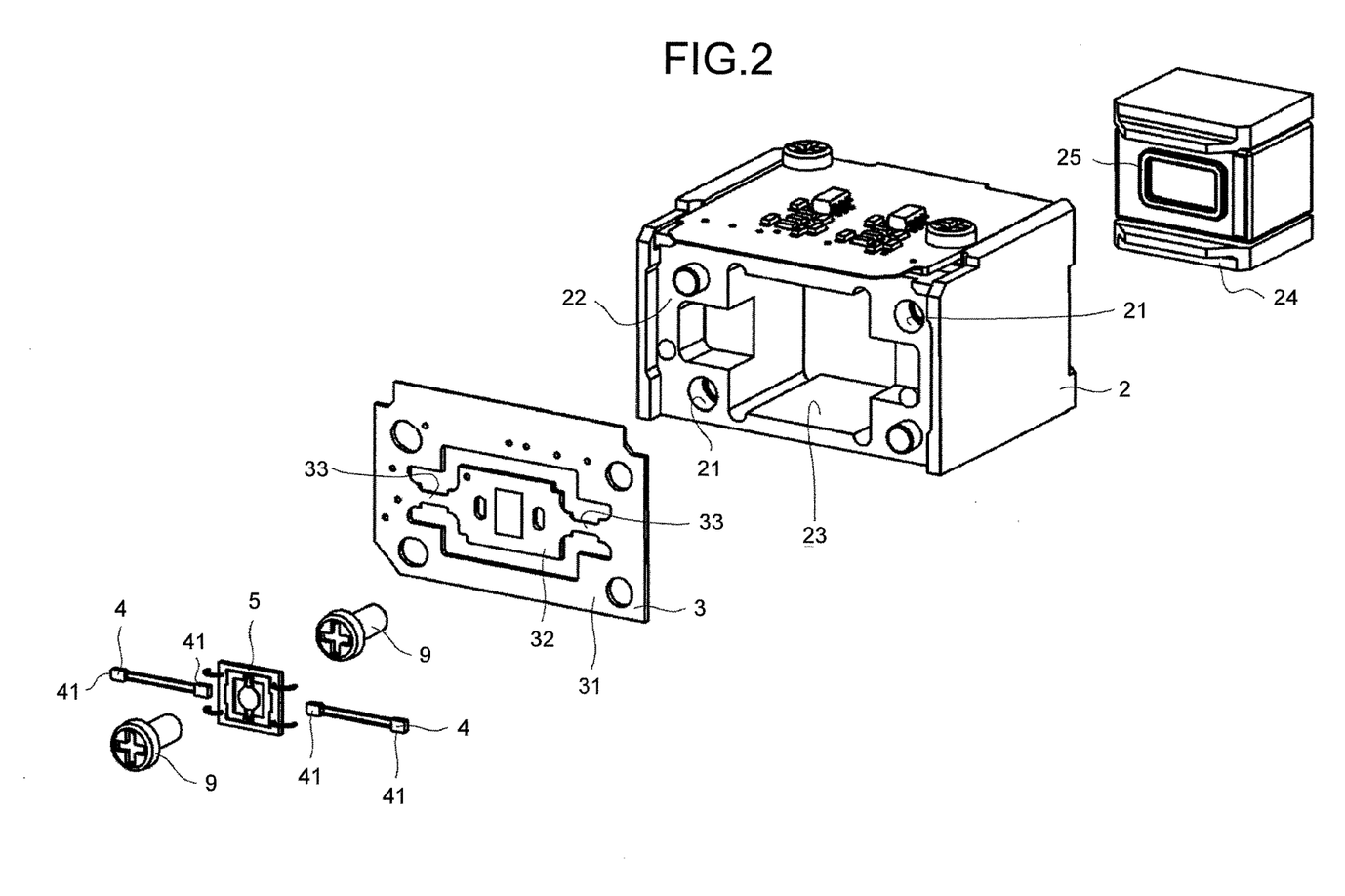
FIG. 2 is an exploded perspective view illustrating the MEMS optical scanner.

As illustrated in FIG. 2, the housing 2 is a substantially rectangular parallelepiped having a substrate attachment portion 21 on a front face 22. On the front face 22, there is a holding portion 23, which is opened. The holding portion 23 is capable of holding a coil holding body 24, which is provided with a power coil 25, by fitting it therein or the like. It is possible to fix the substrate 3 to the substrate attachment portion 21 by a fixing means such as fastening with a bolt 9. The housing 2 is provided as necessary with a substrate, wiring, and the like for allowing the MEMS optical scanner 1 to function.

With reference also to FIG. 3A, the substrate 3 includes a frame portion 31, an optical scanner element support portion 32, and an axis portion 33. The substrate 3 is a plate-shaped body capable of being flexibly bent and curved when a predetermined stress is applied. The substrate 3 is a plate having better shock resistance than a silicon substrate constituting a mirror 51, a main arm 52, a sub-arm 53, and a frame 54, which are described below. The substrate 3 is provided as necessary with the wiring for allowing the MEMS optical scanner 1 to function. For example, a flexible printed circuit board may be used as the substrate 3.

The frame portion 31 is a substantially frame-shaped body attached to the housing 2 being fastened with the bolt 9. The optical scanner element support portion 32 is a substantially flat plate-shaped body spaced from and surrounded by the frame portion 31. The axis portion 33 is a substantially band-shaped body extending along a V-axis direction from the frame portion 31 and supporting the optical scanner element support portion 32. Here, a V-axis is an axis along a horizontal direction. Note that it is also possible to install a detection coil for detecting operation of the mirror 51 of the optical scanner element 5, described below, in the optical scanner element support portion 32.

With reference to both FIGS. 3A and 3B, in a front view of the housing 2, a low reflection film 34 is installed in the optical scanner element support portion 32 so as to correspond to the optical scanner element 5. The low reflection film 34 is, for example, a black coating. The black coating, compared to a non-black colored coating, absorbs light and has a low reflectance. It is preferred that the low reflection film 34 be a coating having a lower reflectance such as a black coating with no gloss. It is also possible to form the black coating, for example, by using a photosensitive resin. By using the photosensitive resin as the black coating, stray light can be prevented more securely as well as the coating can be collectively formed in a wafer process, whereby productivity is improved. It is also possible to use, for example, an insulating and weather-proof resin as the black coating. By using the insulating and weather-proof resin as the black coating, it is possible to prevent the stray light more securely as well as to allow it to function as passivation, whereby operation of the MEMS optical scanner 1 is stabilized more securely.

With reference to both FIGS. 1 and 2 again, the wire 4 is a liner body fixed to the substrate 3 along the V-axis (FIG. 3) direction alongside the axis portion 33 so as to support the frame portion 31 and the optical scanner element support portion 32. More in detail, the wire 4 is fixed and soldered to the substrate 3 at both ends thereof, and soldered portions 41 are formed. By fixing the wire 4 to the substrate 3, it is possible to increase rigidity of the substrate 3 and heighten a resonant frequency of the substrate 3. The wire 4 is capable of rotary vibrating the optical scanner element support portion 32 centering on the V-axis, for example, by a Lorentz force due to a magnetic field generated by the power coil 25 and a magnet coupled to the wire 4.

Here, as the wire 4, it is preferred that a liner body having Young's modulus of at least 130 GPa be used. The Young's modulus of single-crystal silicon is around 120 to 180 GPa in general. When the liner body having the Young's modulus of 130 GPa or greater is used as the wire 4, it is substantially equivalent to an axis portion of the conventional MEMS optical scanner described in Japanese Laid-open Patent Publication No. 2012-163828, whereby it is suitable. As the liner body, for example, a liner body constituted of a beryllium copper alloy having a diameter of 75 to 85 μm may be used. Furthermore, as an installation method of the wire 4, it is more preferred that, for example, a plurality of wires 4 be installed at an interval of 350 to 400 μm from each other and spacing 80 to 120 μm from the substrate 3. By using the plurality of wires 4, power supply to the detection coil and power supply to a piezoelectric element can be performed easily by using the wires 4, whereby it is suitable. By providing the interval between the wires 4, torsional rigidity of the substrate 3 around the V-axis direction can be increased, whereby it is possible to heighten the resonant frequency. Although the resonant frequency can be made higher as the interval between the wires 4 becomes wider, when it becomes too wide, the torsional rigidity is increased and becomes a load on driving, whereby an interval from 350 to 400 μm is suitable. By spacing the wires 4 from the substrate 3, the torsional rigidity is increased in a part constituted of the axis portion 33 and the wires 4, whereby it is possible to heighten the resonant frequency; however, thickness of the MEMS optical scanner 1 is increased, whereby 80 to 120 μm is suitable. A damping material may be applied to the wires 4. It is also possible to use a wire spring or a plate spring in place of the wire 4; however, the power supply becomes easy by using the liner body of the beryllium copper alloy having the diameter of 75 to 85 μm, whereby it is more suitable. By using the preferred configuration and installation method, it is possible to further heighten the apparent resonant frequency of the substrate 3 by fixing the wires 4 to the substrate 3.

As illustrated in FIG. 4, the optical scanner element 5 includes the mirror 51, four main arms 52, two sub-arms 53, and the frame 54.

The mirror 51 is a substantially disk-shaped body having a reflection surface that reflects light. The mirror 51 is supported by two main arms 52 at each of both ends thereof, whereby it is supported by four main arms 52 in total.

The sub-arm 53 is, for example, a U-shaped plate-shaped body. The sub-arm 53 includes a central portion 531 and two free ends 532 extending from both ends of the central portion 531. Each of the two sub-arms 53 supports the main arm 52 so as to encircle the mirror 51 by coupling each of the two free ends 532 to each end of the two main arms 52.

The frame 54 is a frame-like plate-shaped body. The frame 54 encircles and fixes the two sub-arms 53 by coupling the central portion 531 of each of the two sub-arms 53 to each of opposing inner walls of the frame 54. That is, the frame 54 functions as a base for fixing the central portion 531, which is a part of the sub-arm 53. A support arm 50 is installed near each of four corners of the frame 54. The optical scanner element 5 is fixed to the optical scanner element support portion 32 of the substrate 3 by the support arm 50 (see FIG. 1).

Note that the mirror 51, the main arms 52, the sub-arms 53, and the frame 54 may be formed as an integrated substrate by using, for example, a silicon material such as a silicon-on-insulator (SOI) wafer. For example, it is possible to form the sub-arm 53 to be spaced from the frame 54 by forming a slit 56. That is, the optical scanner element 5 is a substrate formed from the integrated substrate. In the MEMS optical scanner 1, when the optical scanner element 5 is a first substrate, the substrate 3 is a second substrate.

A piezoelectric film 55 is formed on a principal surface of the sub-arm 53. The piezoelectric film 55 has a cut portion 57 in a part corresponding to an area between the central portion 531 and the free ends 532. Note that the cut portion 57 may be formed by cutting off the film in an arc shape. The piezoelectric film 55 is electrically connected to the wiring, which is not illustrated, of the substrate 3, and is capable of being expanded and contracted when a drive signal is applied through the wiring.

Here, in the sub-arm 53, the central portion 531 is fixed to the frame 54 while the free ends 532 are spaced from the frame 54 by the slit 56. When the piezoelectric film 55 performs an expansion and contraction movement, while the central portion 531 is fixed as a fixed portion, the free ends 532 can perform the expansion and contraction movement as a driving portion in an arrow direction, or along a lengthwise direction of the free ends 532. That is, the sub-arm 53 functions as a driving portion having the central portion 531 as the fixed portion and the free ends 532 as movable portions. By the expansion and contraction movement of the free ends 532, it is possible to rotate the mirror 51 centering on an H-axis through the main arms 52.

Here, by the expansion and contraction movement of the piezoelectric film 55, the central portion 531 and the free ends 532 of the sub-arm 53 are bent so as to be twisted, whereby stress that separates the piezoelectric film 55 from the sub-arm 53 is applied. By forming the cut portion 57, it is possible to weaken the stress applied to the piezoelectric film 55 due to torsion between the central portion 531 and the free ends 532. Accordingly, it is possible to suppress the piezoelectric film 55 from being separated from the sub-arm 53.

According to this configuration, by rotary driving the mirror 51 centering on the H-axis and the V-axis while emitting light for displaying the image toward the mirror 51, it is possible to perform the scan with the light in each of the vertical and horizontal directions. That is, it is possible to display the image on a display unit by performing the scan with the light in two axial directions. Since the MEMS optical scanner 1 has the cut portion 57, even if the mirror 51 is rotary driven at a large angle so as to achieve deflection, it is possible to weaken the stress due to the torsion and suppress the piezoelectric film 55 from being separated.

The MEMS optical scanner 1 also has the substrate 3, which has better shock resistance than the silicon substrate. By fixing the wire 4 to the substrate 3, it is possible for the MEMS optical scanner 1 to heighten an apparent resonant frequency of the substrate 3 such that ramp wave driving can be performed and to rotate the mirror in coincident with this resonant frequency. That is, the MEMS optical scanner 1 is capable of performing an efficient rotary movement of the mirror while securing the shock resistance. In other words, the MEMS optical scanner 1 is capable of stably performing the scan with the light.

A surface of the substrate 3 is covered at least with the low reflection film 34, whereby the MEMS optical scanner 1 is capable of absorbing light that strikes the substrate 3 and is capable of more securely preventing stray light reflected by the substrate 3. Accordingly, the MEMS optical scanner 1 is capable of stably performing the scan with the light and displaying the image with a high image quality.

Note that similar to the optical scanner element support portion 32, it is preferred that the main arms 52, the sub-arms 53, the frame 54, and the piezoelectric film 55 be covered with a low reflection film. The low reflection film absorbs light that strikes the main arms 52, the sub-arms 53, the frame 54, and the piezoelectric film 55, whereby it is possible to more securely prevent stray light due to the light reflected by the main arms 52, the sub-arms 53, the frame 54, and the piezoelectric film 55. Accordingly, the MEMS optical scanner 1 is capable of stably performing the scan and displaying the image with the high image quality. It is also possible to adjust an ingredient of the low reflection film 34 so as to increase adherence between the main arms 52, the sub-arms 53, the frame 54, and the piezoelectric film 55, and the low reflection film.

An example of using the black coating as the low reflection film has been described; however, a colored coating other than black may also be used as long as it is capable of sufficiently suppressing the stray light so as to satisfy performance required for a MEMS optical scanner.

According to the present invention, it is possible to provide the MEMS optical scanner that stably performs the scan with the light by performing efficient rotary movement of the mirror while securing the shock resistance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A MEMS optical scanner, comprising:
  a first substrate constituted of a silicon substrate;
  a mirror formed in the first substrate;
  a driving portion configured to drive the mirror by a piezoelectric film in a first axial direction, the piezoelectric film being installed on the first substrate;
  a frame formed in the first substrate and configured to support the driving portion;
  a second substrate constituted of a flexible printed circuit board;
  a support portion formed in the second substrate and configured to support the first substrate;
  a frame portion formed in the second substrate and spaced from and surrounding the support portion; and
  an axis portion formed in the second substrate and configured to support the support portion and the frame portion along a second axial direction, wherein
  the MEMS optical scanner further comprises a rigidity giving portion fixed to the second substrate at both ends thereof along the second axial direction so as to support the frame portion and the support portion as well as having a Young's modulus that increases a rigidity and a resonant frequency of the second substrate, and
  the rigidity giving portion drives the support portion in the second axial direction,
  wherein one end of the rigidity giving portion is fixed to the frame portion, another end of the rigidity giving portion is fixed to the support portion, and a portion of the rigidity giving portion between the one end and the another end overlaps with the axis portion being spaced from the axis portion.

2. The MEMS optical scanner according to claim 1, wherein the rigidity giving portion is configured to have a length longer than that of the axis portion and to have both ends thereof fixed to the frame portion and the support portion formed in the second substrate.

3. The MEMS optical scanner according to claim 1, wherein
the rigidity giving portion is a liner body having the Young's modulus of at least 130 GPa.

4. The MEMS optical scanner according to claim 1, wherein
a part of a surface of the second substrate corresponding to the mirror is covered with a low reflection film.

5. The MEMS optical scanner according to claim 4, wherein
a surface of the driving portion and the frame is covered with the low reflection film.

6. A MEMS optical scanner, comprising:
a mirror;
a substrate constituted of a flexible printed circuit board;
a support portion formed in the substrate and configured to support the mirror;
a frame portion formed in the substrate and spaced from and surrounding the support portion; and
an axis portion formed in the substrate and configured to support the support portion and the frame portion along a predetermined axial direction, wherein
the MEMS optical scanner further comprises a rigidity giving portion fixed to the substrate at both ends thereof along the predetermined axial direction so as to support the frame portion and the support portion and having a Young's modulus that increases a rigidity and a resonant frequency of the substrate, and
the rigidity giving portion drives the support portion in the predetermined axial direction
wherein one end of the rigidity giving portion is fixed to the frame portion, another end of the rigidity giving portion is fixed to the support portion, and a portion of the rigidity giving portion between the one end and the another end overlaps with the axis portion being spaced from the axis portion.

* * * * *